United States Patent [19]
Doninger

[11] Patent Number: 5,192,144
[45] Date of Patent: Mar. 9, 1993

[54] END FINISHING DEVICE FOR ROPE, WIRE, CABLE, AND THE LIKE

[76] Inventor: Michael B. Doninger, 1815 Yale Rd., Merrick, N.Y. 11566

[21] Appl. No.: 710,106

[22] Filed: Jun. 4, 1991

[51] Int. Cl.[5] .............................................. F16B 1/00
[52] U.S. Cl. ...................................... 403/209; 403/89; 29/263; 24/136 B
[58] Field of Search .................. 411/400; 403/89, 213, 403/210, 212, 209; 24/136 B, 135 R; 29/246, 249, 256, 258, 259, 260, 262, 263, 265

[56] References Cited

U.S. PATENT DOCUMENTS

| | | | |
|---|---|---|---|
| 1,401,494 | 12/1921 | Rhorer et al. | |
| 2,009,318 | 7/1935 | Highfield | 173/303 |
| 2,027,415 | 1/1936 | Blackburn | 173/263 |
| 2,539,628 | 1/1951 | Kingdon | 173/259 |
| 2,869,872 | 1/1959 | Nissen | 403/209 X |
| 3,248,684 | 4/1966 | Hubbard et al. | 339/95 |
| 3,353,202 | 11/1967 | Winstead et al. | 403/212 X |
| 3,579,796 | 3/1972 | Fillion | 29/263 |
| 3,651,557 | 3/1972 | Bagley | 29/260 |
| 3,675,898 | 7/1972 | Fattor et al. | 254/134.3 |
| 3,682,440 | 8/1972 | Walker | 411/378 X |
| 3,698,749 | 10/1972 | Yonkers | 287/20.3 |
| 3,923,406 | 12/1975 | Iritz | 403/43 |
| 3,972,103 | 8/1976 | Kenyon | 29/263 |
| 4,481,697 | 11/1984 | Bachle | 24/135 |
| 4,509,233 | 4/1985 | Shaw | 24/136 |
| 4,646,395 | 3/1987 | Mayszak | 24/135 |
| 4,656,698 | 4/1987 | Arakawa | 24/136 |
| 4,819,969 | 4/1989 | Williams | 285/177 |
| 4,939,831 | 7/1990 | Doninger | 29/263 |

FOREIGN PATENT DOCUMENTS

| | | | |
|---|---|---|---|
| 299532 | 8/1932 | Italy | 403/209 |
| 635643 | 3/1962 | Italy | 403/209 |
| 2018932 | 10/1979 | United Kingdom | 403/213 |

*Primary Examiner*—Andrew V. Kundrat
*Attorney, Agent, or Firm*—David P. Gordon

[57] ABSTRACT

A reusable end finishing apparatus for rope, cord, wire, cable and the like is provided. The end finishing apparatus has an outer rigid sleeve, an inner compressible barbed gripping member which engages the end to be finished, and an eyebolt which has a threaded rod which extends through holes in both the compressible gripping member and the outer rigid sleeve. In assembly for use, the termination of the device to be finished is threaded through the eyebolt and doubled back. The eyebolt is then placed in the compressible gripping member with grooves in the gripping member provided for the eyebolt eye. The threaded rod end of the eyebolt is moved through a hole in the compressible gripping member until the eye of the eyebolt bottoms in the gripping member. The gripping member and termination are advanced into and compressed by the outer sleeve by locating the eyebolt rod in the hole in the outer rigid sleeve, threading a fastener on the extended threaded rod of the eyebolt, and rotating the fastener appropriately.

19 Claims, 5 Drawing Sheets

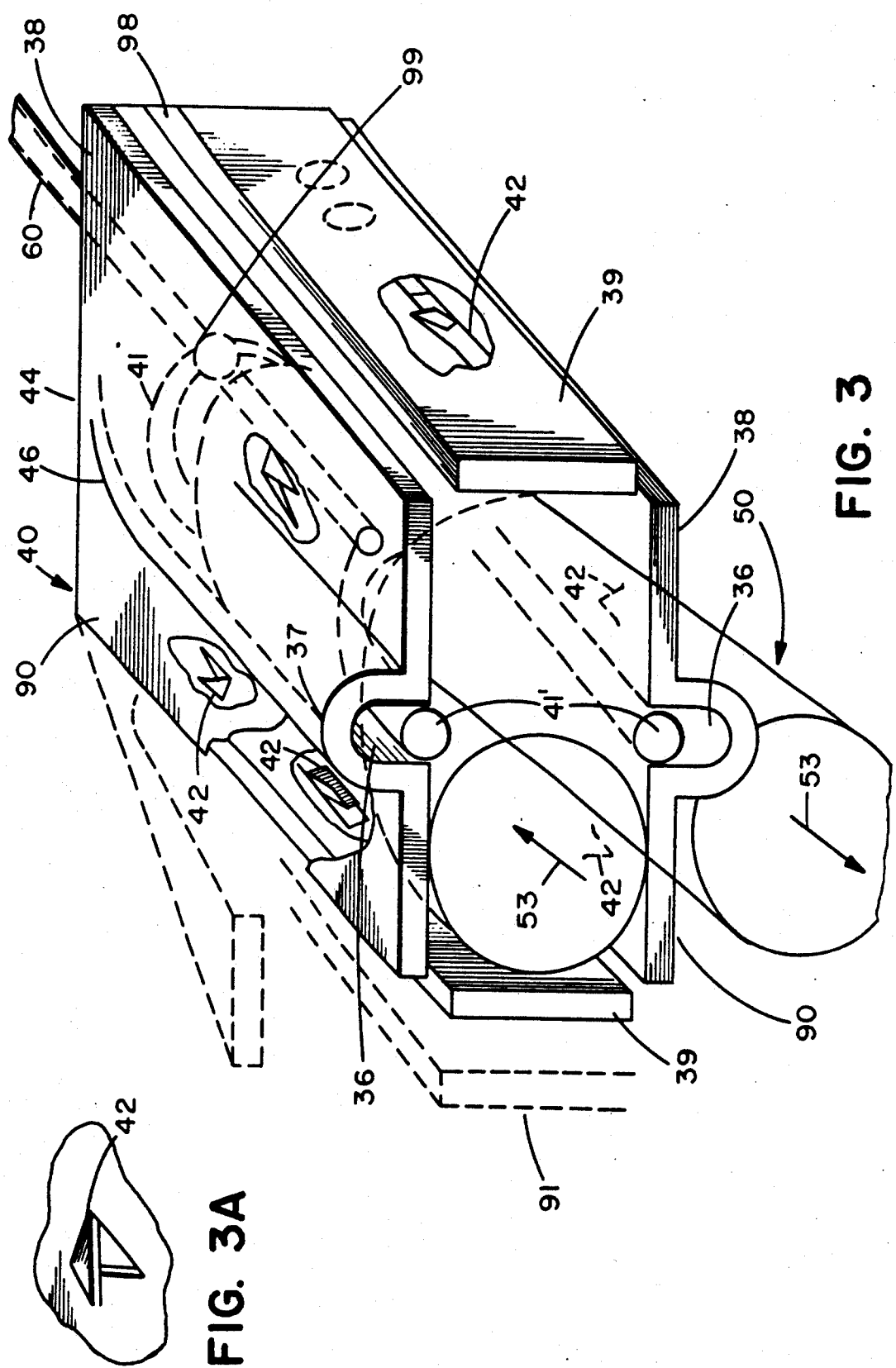

END FINISHING DEVICE FOR ROPE, WIRE, CABLE, AND THE LIKE

BACKGROUND

The present invention is broadly directed to devices for the end finishing of terminations of flexible items such as rope, wire, cable, cord, and the like; i.e., items whose terminations are commonly ragged and not readily coupled to other components unless provided with an end finishing attachment. More particularly, the present invention is directed to end finishing devices for items described above which are designed to be used without the need for any special tools and which can be re-used indefinitely and are readily combined in a threaded engagement with other components, such as turnbuckles, terminal lugs, toggle connectors for blind hole applications, casters, threaded nuts, holes, and connectors.

End finishing arrangements are well known and are currently widely used in a variety of commercial and industrial applications. U.S. Pat. No. 4,939,831 to Michael B. Doninger, which is hereby incorporated by reference herein in its entirety, discloses a re-usable end finishing apparatus which is very effective. However, there are situations where increased holding strength is required of the finishing element.

SUMMARY OF THE INVENTION

It is therefore an object of the present invention to provide an end finishing device for a wide variety of flexible items such as ropes, wire, cable, cord and the like.

It is a further object of the present invention to provide an end finishing device which can be used without the need for special tools or equipment.

It is another object of the present invention to provide an end finishing device which can be readily used in combination with an eyebolt type of engagement.

It is a further object to provide an end finishing device which has increased gripping strength.

In accord with the objects of the invention, an apparatus is provided for end finishing of a termination of a flexible item such as rope, cord, wire, cable and the like. The apparatus generally comprises a hollow rigid sleeve member, an eyebolt, and a compressible gripping member having inwardly extending barbs. The hollow rigid sleeve member is open at one end and has a relatively small opening at its opposite end. The eyebolt has a ring-shaped member, and a longitudinally extending threaded rod coupled to the ring-shaped member, with the plane of the ring-shaped member being in alignment with the longitudinal axis of the threaded rod and the threaded rod being adapted to engage a threaded fastener external to the hollow sleeve member. The rod of the eyebolt passes freely through the relatively small opening in the sleeve member. The compressible gripping member at least partially surrounds a doubled over portion of the termination, and is configured to slidably engage and at least partly enclose the ring-shaped member coupled to the threaded rod, and to be compressible and enable a close nesting fit within the sleeve member. A threaded fastener is located outside the sleeve member and adjacent the relatively small opening thereof and is peripherally engaged with the threaded rod member so that upon advancement of the threaded rod through the peripherally engaged threaded fastener the gripping member and the termination engaged therewith are advanced a corresponding amount into the hollow sleeve member. In this manner, the compressible gripping member is compressed and grips the termination, whereby the termination of the item is finished and the item is available for its desired use.

In accord with a preferred aspect of the present invention, the gripping member is generally rectangular in cross-section and includes a base with a relatively small central opening, and four sides attached only at the base of the gripping member. Preferably, two of the four sides are provided with raised channels to accommodate placement of the ring of an eyebolt therein.

A better understanding of the end finishing device of the invention, as well as additional advantages and objects will become apparent to those skilled in the art upon reference to the detailed description and accompanying drawings.

BRIEF DESCRIPTION OF THE DRAWINGS

FIG. 3 is a perspective view partly in section of the preloaded gripping member of the end finishing apparatus of the invention prior to its insertion in the sleeve member.

FIG. 3A is an enlarged perspective view of a barb member.

DETAILED DESCRIPTION OF THE PREFERRED EMBODIMENTS

Figure 1:
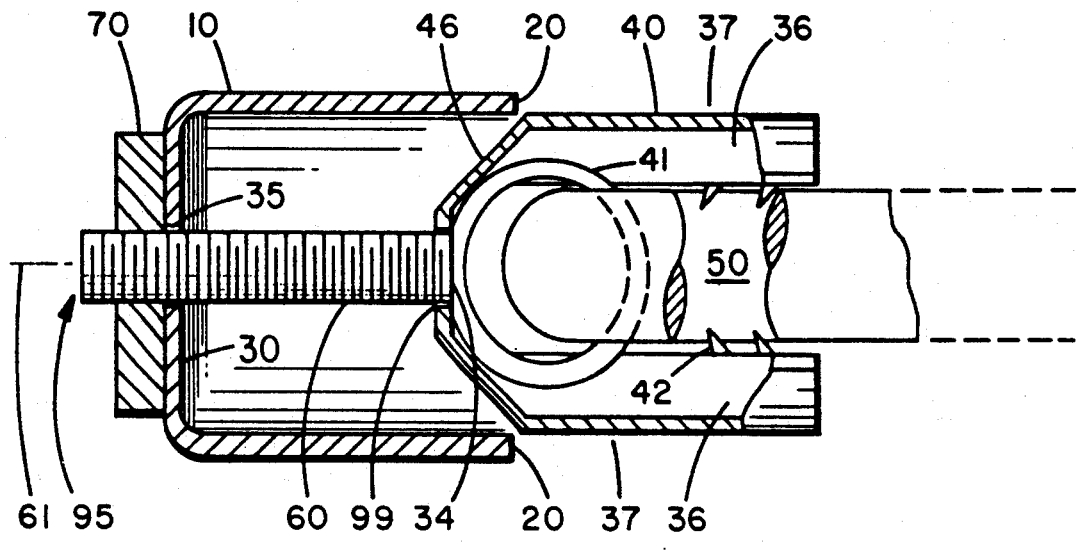
FIG. 1 is an elevational cross-section of the preferred end finishing apparatus of the present invention in an initial stage of assembly.
Figure 1A:
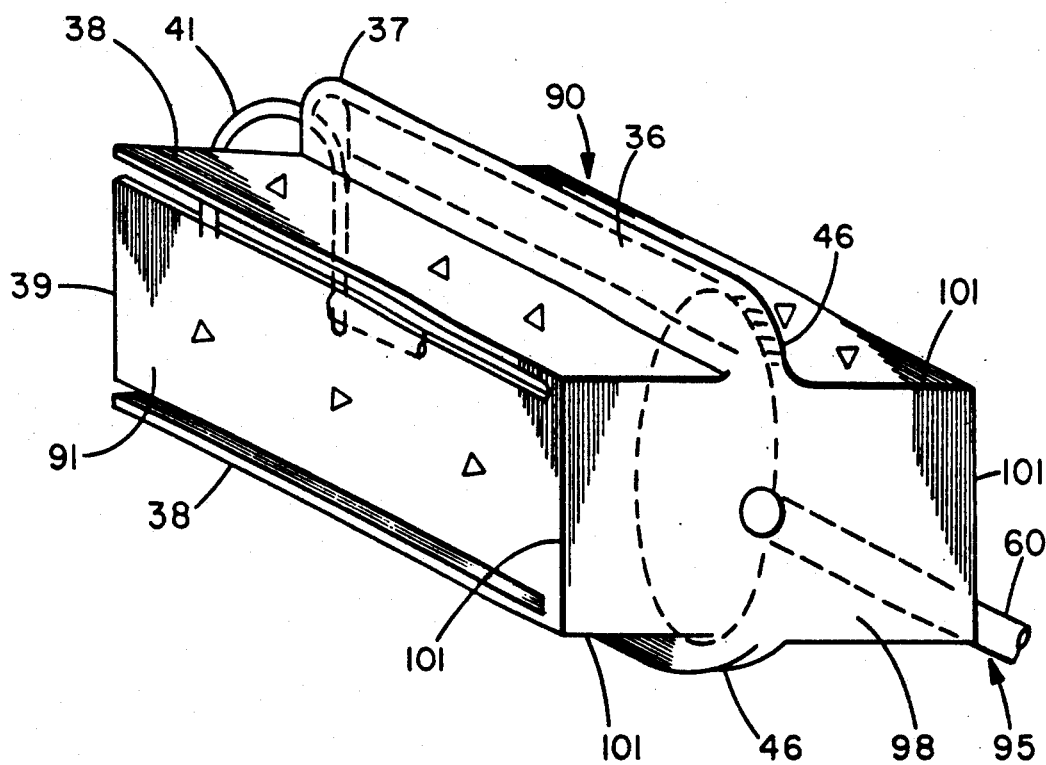
FIGS. 1(A), 1(B) and 1(C) are perspective views of various embodiments of a gripping means of the present invention.
Figure 1B:
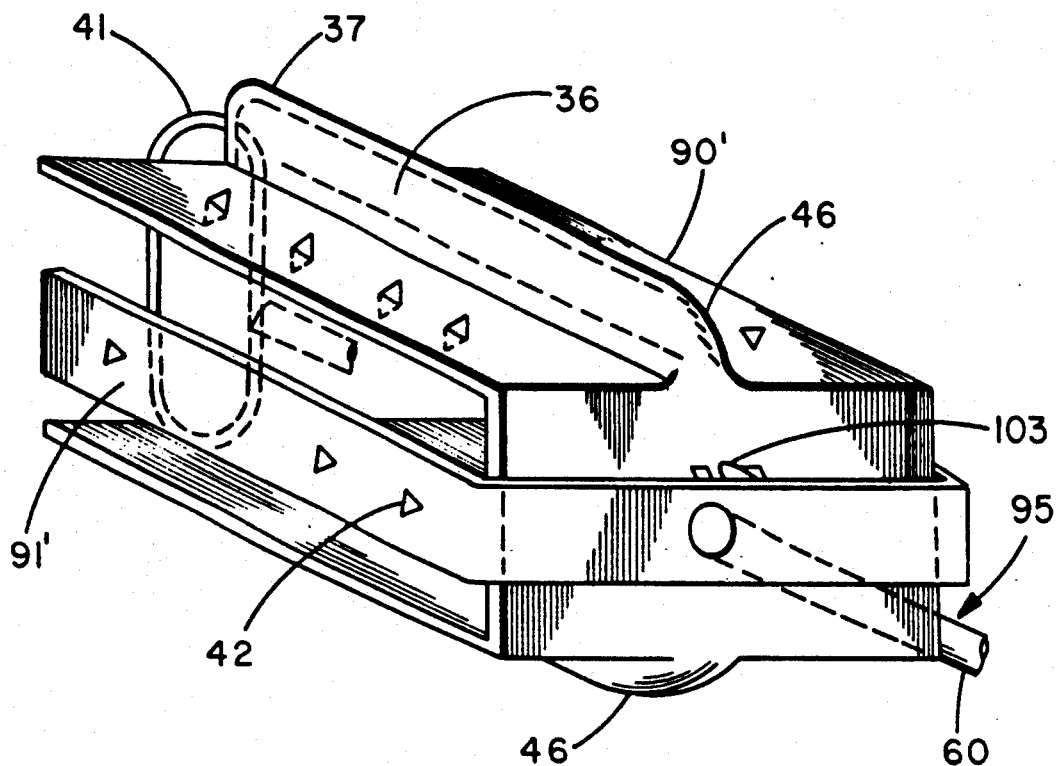
Figure 1C:
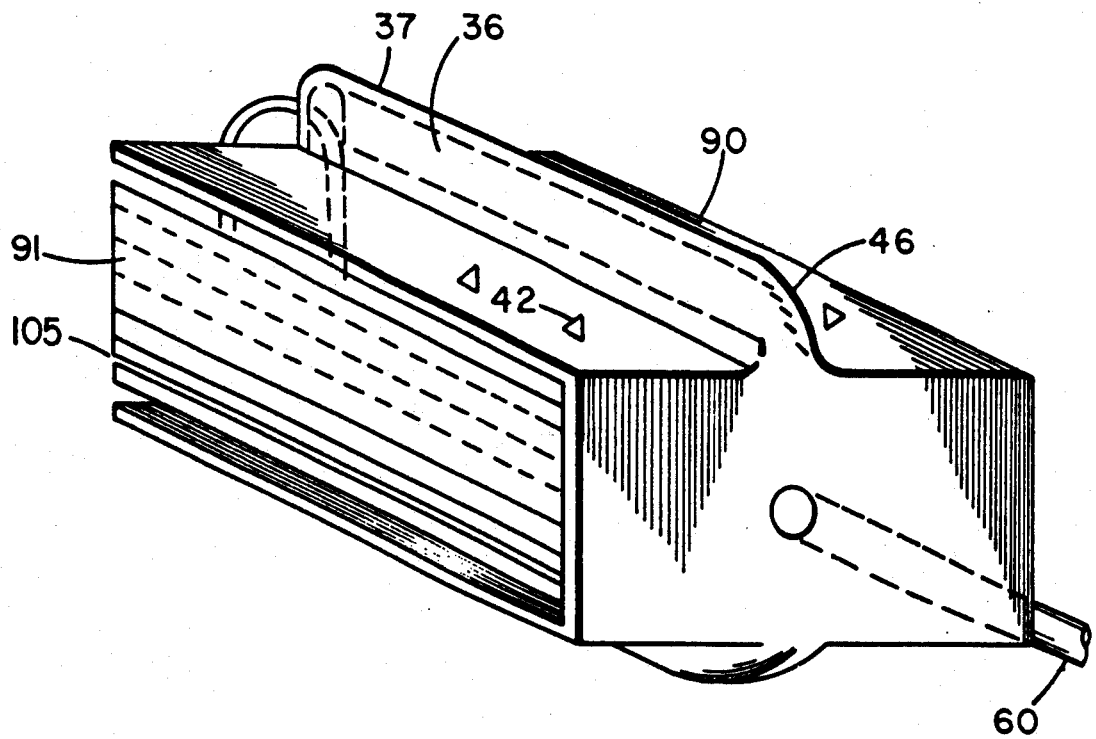

An end finishing apparatus in accordance with the present invention is shown in FIG. 1 and FIGS. 2(A)–2(D) and FIG. 3. The end finishing apparatus, as shown in FIGS. 1 and 2(A)–2(D) is broadly comprised of a rigid sleeve 10, a gripping member 40, and an eyebolt 95 which includes a ring-shaped member 41 which is integral with a longitudinally extending rod 60 having an axis 61. The rigid sleeve 10 is suitably made of metal (brass, stainless steel) or plastic, and is open at one end 20 and closed at its other end 30, except for a relatively small opening 35 in end 30 through which rod 60 freely passes. The gripping member 40 is also suitably made of a metal, and is preferably inwardly compressible. As seen in FIGS. 1(A)–1(C), the gripping member 40 may assume various forms. Preferably, as shown in FIGS. 1(A) and 1(C), the gripping member 40 assumes the form of a generally rectangular shell having opposed wider sides 38 and opposed narrower sides 39, with all four sides terminating in a common base 98. The wider sides 38 of gripping member 40 each have a raised longitudinal internal groove 36 which slidably engages the ring-shaped member 41 of eyebolt 95. Also, as indicated in FIG. 1 and FIG. 3, gripping member 40 is preferably preloaded such that in its unstressed position, the opposed sides of the gripping member extend away (i.e. open) from each other as they extend away from their common base 98.

Common base 98 is sized so as to have one dimension approximately the same as the initial width (diameter)

of the termination 50, and the other dimension approximately the same as twice the initial width of the termination 50. In this manner, when gripping member 40 is drawn into sleeve member 10 as discussed in more detail hereinafter, bearing contact is brought to bear by sleeve 10 on the outermost bounding surface 37 of the raised grooves 36 of wider sides 38, and on the outermost surface of narrower sides 39; and in turn, the termination 50 is gripped tightly in the end finishing apparatus by bearing contact of the sides 38 and 39 on the termination 50. As shown in FIG. 1(A) the gripping member 40 has a generally rectangular cross-section and its four sides 38, 39 are separated at their respective edges and are joined only to the base 98 at one end in independent flexible hinging connections or edges 101.

An alternative embodiment of gripping member 40 is seen in FIG. 1(B), where the gripping member is formed from two U-shaped strips 90' and 91'. The U-shaped strips 90' and 91' are joined together at their bases. The preferred embodiment of FIG. 1(A) is the equivalent of the two U-shaped strips of FIG. 1(B), with the common base 98 serving as the bottom of each "U" member. Thus, the sides 38 and 39 are also indicated in FIG. 1(A) as U-shaped member 90 and 91. Similarly, another embodiment of the gripping member shown in FIG. 1(C), the U-shaped strip 91 is grooved at 105 to facilitate crimping.

Figure 2A:
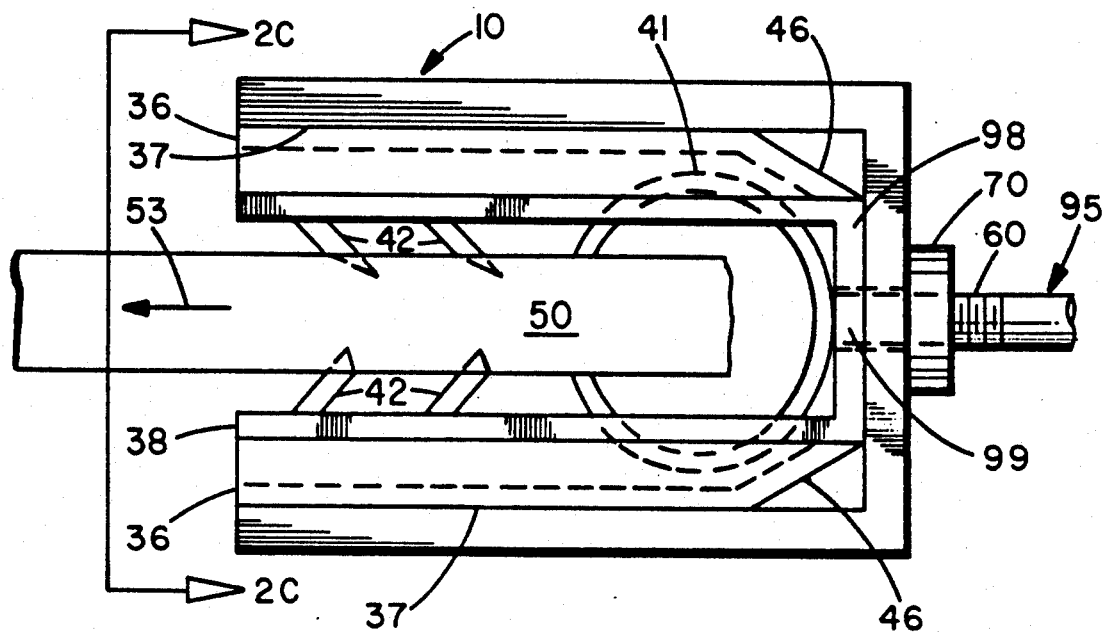
FIGS. 2(A) and 2(B) are opposite elevational views of the assembled device of FIG. 1.
Figure 2B:
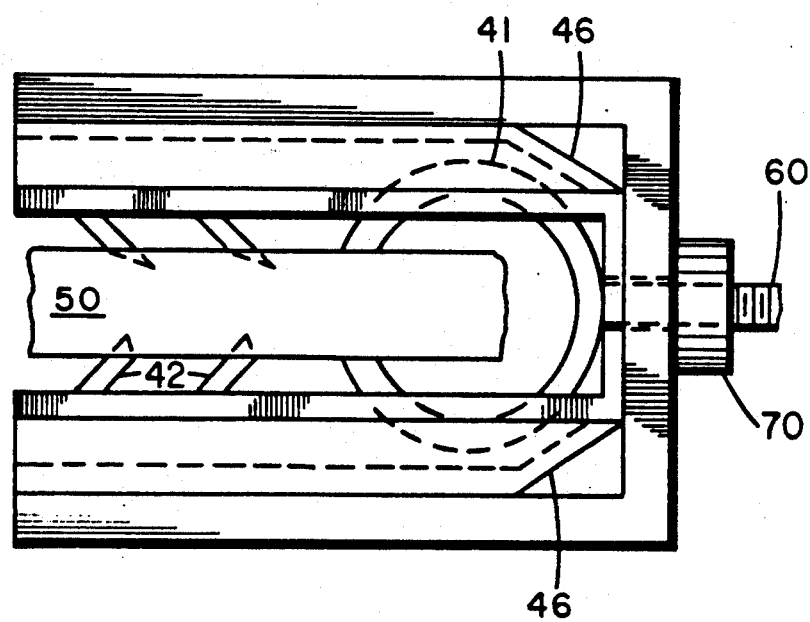
Figure 2C:
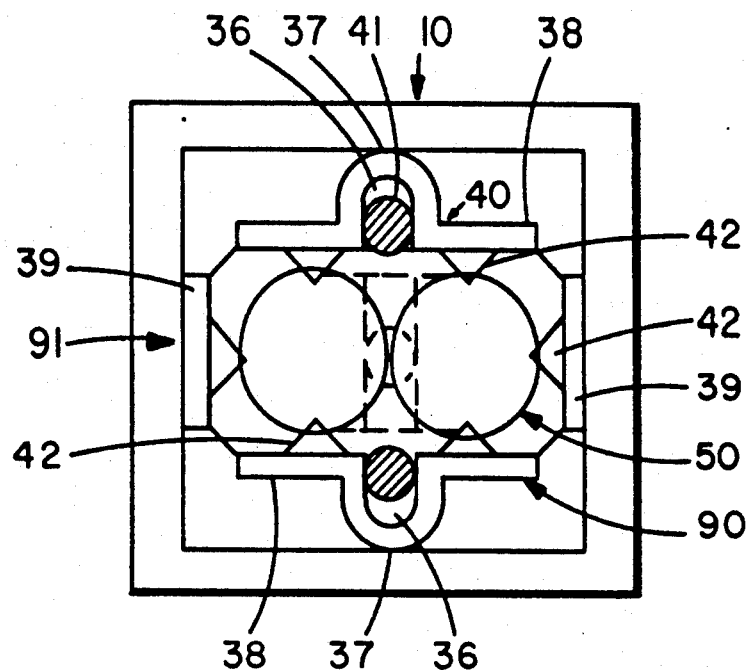
FIG. 2(C) is an end view of the device of FIG. 1.
Figure 2D:
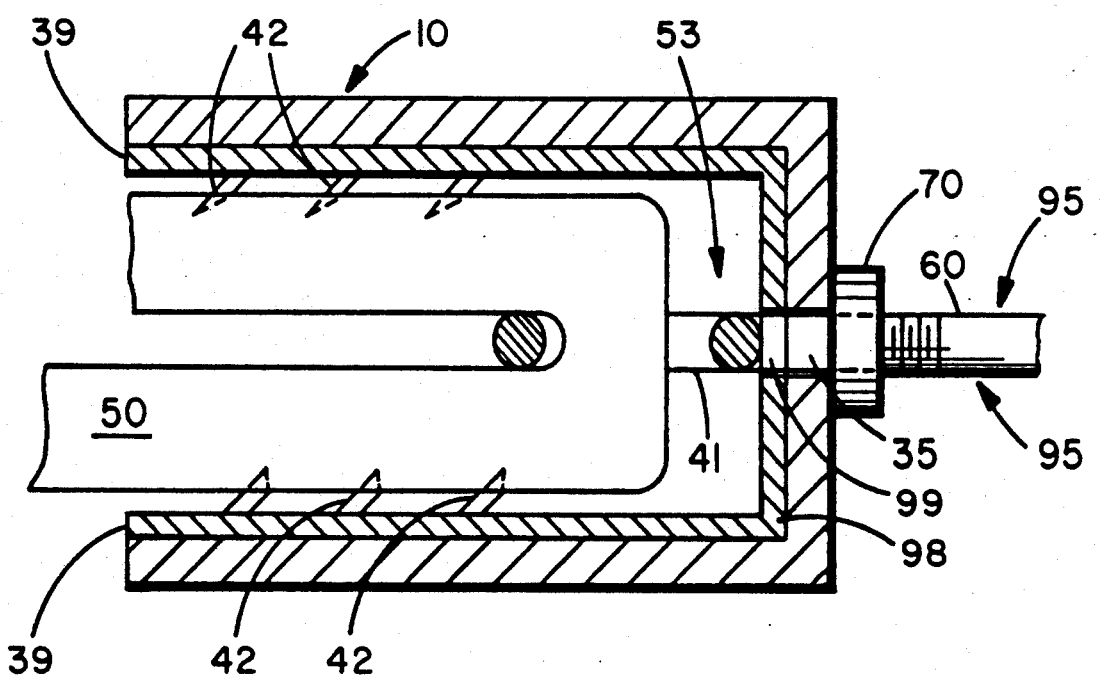
FIG. 2(D) is a plan view of the device of FIG. 1.

As seen in FIGS. 2(A)–2(D), sides 38 and 39 of gripping member 40 are provided with barbs 42 which extend inwardly therefrom. When termination 50 is compressibly gripped by gripping member 40, the barbs 42 penetrate the termination, with the barbs on opposite sides of groove 36 angling in opposite directions, and with barbs on the opposite narrower sides 39 angling in opposite directions (as best seen in FIG. 2(D)). In fact, the barbs 42 are preferably arranged so that when the termination 50 is subjected to an applied tensile force as illustrated at 53, the barbs 42 are all angled in a direction opposite to the direction that the termination 50 would have to move to escape ring member 41 and gripping member 40.

With reference to FIG. 1, the eyebolt 95 comprises a threaded, longitudinally extending rod 60 and an integral ring-shaped member 41 which is coupled to the rod 60 at 34 such that the plane of the ring-shaped member 41 is in alignment with the longitudinal axis of rod 60. The rod 60 passes freely through the central opening 35 in the relatively closed end of the rigid sleeve 10. The rod also extends through a hole 99 in the gripping means member 40.

In use, a termination 50 such as a rope termination or the like is placed through ring-shaped member 41 of the eyebolt 95 and doubled back at least a short distance. With the termination 50 in place, the eyebolt 95 is placed in the gripping means 40 such that the ring-shaped member 41 (FIG. 3) engages grooves 36, and the threaded rod 60 extends through hole 99. Once the threaded rod 60 extends through in gripping means 40 hole 99, the threaded rod may be used to advance the eyebolt 95 as far into the gripping means 40 as possible, until the ring-shaped member 41 abuts the base 98. The gripping means 40 is then entered with base 98 first into the sleeve member 10, with threaded rod 60 extending freely through hole 35 in the sleeve member 10. The sloping forward portion 46 of raised grooves 36 facilitates entry of gripping means 40 into sleeve member 10. A hexagonal nut 70 is placed on and peripherally engages threaded rod 60 external to sleeve member 10 and acts as a jam nut. As the hexagonal jam nut is turned, the threaded rod 60 advances through the hexagonal nut 70 (pliers only being required), and the gripping member 40 and engaged doubled over termination 50 correspondingly advance by the same amount into sleeve member 10. Advancement of the gripping member 40 into sleeve member 10 causes gripping member 40 to be compressed and to nest snugly in sleeve 10 with the outer most surfaces of raised grooves 36 and the narrower sides 39 bearing against sleeve 10 as illustrated in FIG. 2(C), and with barbs 42 biting into termination 50 in a direction opposite to an applied tensile force 53.

The end finishing device of the present invention can be combined with other components (as is described in U.S. Pat. No. 4,939,831) such as terminal lugs, turn buckles, toggle connectors for blind hole applications, threaded nuts or holes, casters and the like.

There has been described and illustrated herein an end finishing device in accordance with the present invention. While particular embodiments of the invention have been described, it is not intended that the invention be limited exactly thereto, as it is intended that the invention be as broad in scope as the art will permit. Thus those skilled in the art will recognize that while metal construction is disclosed and preferred, other materials, such as plastics and composites may be used for particular purposes. Also, while the invention was described as using a hexagonal nut as a fastening means, and using a pliers for gripping the nut so as to advance the gripping means into the sleeve member, it will be appreciated that a common wrench or other similar means could be used for gripping the nut. Similarly, other fastening means such as a wing nut could be utilized in lieu of the hexagonal nut. Further, those skilled in the art will appreciate that while certain geometries and configurations were described and illustrated, other geometries and configurations could apply. For example, the sleeve need not be square (it could be any of many shapes), and the "ring" of the eyebolt need not be circular (all that is required is an eye of any shape through which the termination can extend). The barbs need not angle in opposite directions, and the eyebolt need not be separate from the gripping means (it could be integral). The bases of the U-shaped members of the gripping means need not have a common base (they can be separate and stacked at their bases as shown at 103 in FIG. 1(B), as long as they do not rotate relative to each other), and the relative lengths of the narrow and wider sides need not be 1:2. Therefore it will be apparent to those skilled in the art that other changes and modifications may be made to the invention as described in the specification without departing from the spirit and scope of the invention.

I claim:

1. An apparatus for engagement with and for end finishing of a termination of a flexible item such as a rope, cord, wire, cable or the like, and for use with a bolt means having an eye member through which the termination can extend and also having a longitudinally extending threaded rod member coupled at a first end to said eye member with said eye member being in alignment with the longitudinal axis of the threaded rod member, said apparatus comprising:

(a) a hollow rigid sleeve member open at one end and having a first opening at its opposite end, wherein the rod member can pass through said first opening in said sleeve member; and (b) a compressible gripping member open at one end and having a second opening at its opposite end through which said rod member can pass, and having inwardly extending barbs for gripping said termination, said gripping member at least partially surrounding a doubled over portion of the termination, and configured to engage said eye member to substantially prevent rotation of said eye member relative to said compressible gripping member, said gripping member being adapted to be drawn into said hollow sleeve member and to be compressed thereby so as to be in a close nesting fit within said sleeve member.

2. An apparatus according to claim 1, further comprising:
(c) said bolt means.

3. An apparatus according to claim 2, further comprising:
(d) a threaded fastener located outside said sleeve member and adjacent said first opening thereof and peripherally engaged with said threaded rod member of said bolt means so that upon advancement of the threaded rod through said peripherally engaged threaded fastener, said gripping member and the termination engaged therewith are advanced a corresponding amount into said hollow sleeve member, said compressible gripping member being thereby compressed and firmly gripping said termination.

4. An apparatus according to claim 1, wherein:
said gripping member is generally rectangular in cross section and includes a base having said second opening substantially centrally located therein, and four sides attached at said base.

5. An apparatus according to claim 4, wherein:
two of said four sides have longitudinally opposed, integral raised channels for slidable engagement with said ring-shaped member and for bearing contact with said hollow sleeve member.

6. An apparatus according to claim 3, wherein:
said gripping member is generally rectangular in cross section and includes a base having said second opening substantially centrally located therein, and four sides attached at said base.

7. An apparatus according to claim 6, wherein:
two of said four sides have longitudinally opposed, integral raised channels for slidable engagement with said ring-shaped member and for bearing contact with said hollow sleeve member.

8. An apparatus according to claim 7, wherein:
said raised channels terminate at and slope toward said base with which they are integral.

9. An apparatus according to claim 1, wherein:
said gripping member includes two U-shaped strips engaged at their bases, said second opening in said gripping member comprising coaxially aligned holes in the bases of said two U-shaped strips.

10. An apparatus according to claim 9, wherein:
a first of said U-shaped strips has longitudinally opposed, integral raised channels for slidable engagement with said ring-shaped member and in bearing contact with said hollow sleeve member.

11. An apparatus according to claim 10, wherein:
said raised channels terminate at and slope toward said base with which they are integral.

12. An apparatus according to claim 1, wherein:
said inwardly extending barbs are arranged so that when said flexible item is subject to an applied tensile force said barbs are in a direction opposite to said applied tensile force.

13. An apparatus according to claim 3, wherein:
said inwardly extending barbs are arranged so that when said flexible item is subject to an applied tensile force said barbs are in a direction opposite to said applied tensile force.

14. An apparatus according to claim 7, wherein:
said inwardly extending barbs are arranged so that when said flexible item is subject to an applied tensile force with barbs are in a direction opposite to said applied tensile force.

15. Apparatus for engagement with and for end finishing of a termination of a flexible item such as a rope, cord, wire, cable or the like which comprises:
(a) a hollow rigid sleeve member open at one end and having a relatively small opening at its opposite end;
(b) a bolt means having an eye member through which the termination can extend and also having a longitudinally extending threaded rod member coupled at a first end to said eye member with said eye member being in alignment with the longitudinal axis of the threaded rod member, said rod member passing through said relatively small opening in said sleeve member;
(c) a compressible gripping member open at one end and having a relatively small opening at its opposite end, and having inwardly extending barbs for gripping said termination, said gripping member at least partially surrounding a doubled over portion of the termination, and configured to engage said eye member to substantially prevent rotation of said eye member relative to said compressible gripping member, said gripping member being adapted to be drawn into said hollow sleeve member and to be compressed thereby so as to be in a close nesting fit within said sleeve member.

16. An apparatus according to claim 15, further comprising:
(d) a threaded fastener located outside said sleeve member and adjacent the relatively small opening thereof and peripherally engaged with said threaded rod member so that upon advancement of the threaded rod through said peripherally engaged threaded fastener, said gripping member and the termination engaged therewith are advanced a corresponding amount into said hollow sleeve member, said compressible gripping member being thereby compressed and firmly gripping said termination.

17. An apparatus according to claim 16, wherein:
said inwardly extending barbs are arranged so that when said item is subject to an applied tensile force said barbs are in a direction opposite to said applied tensile force.

18. An apparatus according to claim 17, wherein:
said gripping member is generally rectangular in cross section and includes a base having said second opening substantially centrally located therein, and four sides attached at said base.

19. An apparatus according to claim 18, wherein:
two of said four sides have longitudinally opposed, integral raised channels for slidable engagement with said ring-shaped member and for bearing contact with said hollow sleeve member.

* * * * *